(12) United States Patent
Hughes et al.

(10) Patent No.: US 7,670,995 B2
(45) Date of Patent: *Mar. 2, 2010

(54) VISCOELASTIC WELLBORE TREATMENT FLUID

(75) Inventors: Trevor Hughes, Cambridge (GB); Timothy Gareth John Jones, Cottenham (GB); Gary John Tustin, Sawston (GB); Jian Zhou, Sugar Land, TX (US)

(73) Assignee: Schlumberger Technology Corporation, Ridgefield, CT (US)

( * ) Notice: Subject to any disclaimer, the term of this patent is extended or adjusted under 35 U.S.C. 154(b) by 365 days.

This patent is subject to a terminal disclaimer.

(21) Appl. No.: 10/343,213

(22) PCT Filed: Jul. 11, 2001

(86) PCT No.: PCT/GB01/03131

§ 371 (c)(1),
(2), (4) Date: Oct. 27, 2003

(87) PCT Pub. No.: WO02/11874

PCT Pub. Date: Feb. 14, 2002

(65) Prior Publication Data

US 2004/0067855 A1   Apr. 8, 2004

(30) Foreign Application Priority Data

Aug. 7, 2000 (GB) .................................. 0019380.5
Feb. 21, 2001 (GB) .................................. 0104237.3

(51) Int. Cl.
*C09K 8/60* (2006.01)
*C09K 8/74* (2006.01)
*E21B 43/16* (2006.01)

(52) U.S. Cl. .................. 507/260; 507/267; 507/269; 166/305.1

(58) Field of Classification Search ................. 507/260, 507/267, 269; 166/305.1
See application file for complete search history.

(56) References Cited

U.S. PATENT DOCUMENTS

| 2,793,219 | A | * | 5/1957 | Barrett et al. ............... 562/509 |
| 2,793,220 | A | * | 5/1957 | Barrett et al. ............... 562/509 |
| 2,877,848 | A |   | 3/1959 | Case |
| 2,935,474 | A | * | 5/1960 | Kirkpatrick et al. ......... 507/240 |
| 2,994,660 | A | * | 8/1961 | Reddie et al. ............... 507/131 |
| 3,093,609 | A | * | 6/1963 | Feigley, Jr et al. ............ 524/60 |

(Continued)

FOREIGN PATENT DOCUMENTS

EP    0 835 983  A2    4/1998

(Continued)

OTHER PUBLICATIONS

Chang et al Case study of a novel acid-diversion technique in carbonate reservoirs SPE Annual Technical Conference and Exhibition, Houston, Texas, Oct. 3-6, 1999, SPE 56529.

Dam et al Synthesis, surface properties and oil solubilisation capacity of cationic gemini surfactants Colloids Surfaces A, vol. 118, 1996, pp. 41-49.

(Continued)

*Primary Examiner*—Daniel S Metzmaier
(74) *Attorney, Agent, or Firm*—James McAleenan; Helene Raybaud; Brigid Laffey

(57) ABSTRACT

A viscoelastic wellbore treatment fluid comprises an effective amount of an oligomeric surfactant for controlling the viscoelasticity of the fluid.

7 Claims, 10 Drawing Sheets

U.S. PATENT DOCUMENTS

| | | | |
|---|---|---|---|
| 3,684,720 A | | 8/1972 | Richardson |
| 3,721,707 A | * | 3/1973 | Straus ........................ 562/101 |
| 3,745,135 A | * | 7/1973 | Pruckmayr .................. 524/313 |
| 4,108,779 A | | 8/1978 | Carney |
| 4,556,107 A | | 12/1985 | Duerksen et al. |
| 4,556,495 A | | 12/1985 | Shaw |
| 4,576,232 A | | 3/1986 | Duerksen et al. |
| 4,607,700 A | | 8/1986 | Duerksen et al. |
| 4,630,679 A | | 12/1986 | Reeves, III et al. |
| 4,725,372 A | | 2/1988 | Teot et al. |
| 4,735,731 A | | 4/1988 | Rose et al. |
| 4,790,958 A | | 12/1988 | Teot |
| 4,819,729 A | | 4/1989 | Bae et al. |
| 5,110,487 A | * | 5/1992 | Current ....................... 507/259 |
| 5,183,112 A | | 2/1993 | Paul et al. |
| 5,193,618 A | | 3/1993 | Loh et al. |
| 5,258,137 A | | 11/1993 | Bonekamp et al. |
| 5,551,516 A | | 9/1996 | Norman et al. |
| 5,656,586 A | | 8/1997 | Li et al. |
| 5,710,121 A | | 1/1998 | Tracy et al. |
| 5,789,371 A | | 8/1998 | Tracy et al. |
| 5,846,926 A | | 12/1998 | Tracy et al. |
| 5,922,671 A | | 7/1999 | Tracy et al. |
| 5,952,290 A | | 9/1999 | Li et al. |
| 5,964,295 A | | 10/1999 | Brown et al. |
| 5,979,557 A | | 11/1999 | Card et al. |
| 6,194,356 B1 | | 2/2001 | Jones et al. |
| 6,232,274 B1 | | 5/2001 | Hughes et al. |
| 6,248,699 B1 | * | 6/2001 | Subramanian et al. ...... 507/265 |
| 6,433,075 B1 | | 8/2002 | Davies et al. |
| 6,443,228 B1 | | 9/2002 | Aronstam et al. |
| 6,613,720 B1 | | 9/2003 | Feraud et al. |
| 6,702,023 B1 | | 3/2004 | Harris et al. |
| 7,036,585 B2 | * | 5/2006 | Zhou et al. ................... 507/239 |
| 2002/0004464 A1 | | 1/2002 | Nelson et al. |
| 2007/0213232 A1 | * | 9/2007 | Hartshorne et al. ......... 507/267 |

FOREIGN PATENT DOCUMENTS

| | | |
|---|---|---|
| EP | 0 835 983 A3 | 4/1998 |
| GB | 2 332 223 B | 1/2000 |
| GB | 2 332 224 B | 1/2000 |
| GB | 2 335 680 B | 5/2000 |
| GB | 2 335 679 B | 9/2000 |
| GB | 2 365 427 A | 2/2002 |
| GB | 2 365 464 B | 9/2002 |
| NO | 310.910 | 9/2001 |
| WO | 93/04259 | 3/1993 |
| WO | 96/37683 A1 | 11/1996 |
| WO | 98/56497 A1 | 12/1998 |
| WO | 99/50529 A1 | 10/1999 |
| WO | 01/77487 A2 | 10/2001 |
| WO | 01/77487 A3 | 10/2001 |
| WO | 02/11873 A1 | 2/2002 |
| WO | 02/12673 A1 | 2/2002 |

OTHER PUBLICATIONS

Duivenvoorde et al Synthesis and properties of di-n-dodecyl a,w-alkyl bisphosphate surfactants Langmuir, vol. 13, 1997, pp. 3737-3743.
Henkel Corporation Chemicals Group Abstracts of dimer acid use—patents and journal references Henkel Corporation Technical Bulletin 109A, vol. 1, 1968.
Hoffmann et al Surfactants, micelles and fascinating phenomena Angew. Chem.. Int. Ed. Engl., vol. 27, 1988, pp. 902-912.
In et al Dynamics of branched threadlike micelles Physical review letters, vol. 83, No. 11, 1999, pp. 2278-2281.
In et al Quaternary ammonium bromide surfactant oligomers in aqueous solution: self-association and microstructure Langmuir, vol. 16, 2000, pp. 141-148.
Jaeger et al Double-chain surfactants with two carboxylate head groups that form vesicles Langmuir, vol. 12, 1996, pp. 1976-1980.
Johnson Polymerization of fatty acids Fatty acids in industry (Johnson and Fritz eds.), Marcel Dekker, New York, 1989, pp. 153-175.
Kern et al Dynamical properties of salt-free viscoelastic micellar solutions Langmuir, vol. 10, 1994, pp. 1714-1723.
Kim et al Surface-active properties of novel cationic surfactants with two alkyl chains and two ammonio groups J. Amer. Oil Chem. Soc., vol. 73, No. 7, 1996, pp. 907-911.
Knaebel et al Lamellar structures in aqueous solutions of a dimeric surfactant Langmuir, vol. 16, 2000, pp. 2489-2494.
Luchetti et al NMR investigation on the various aggregates formed by a Gemini chiral surfactant Langmuir, vol. 16, 2000, pp. 161-165.
Menger et al Cross-linked micelles Langmuir, vol. 11, 1995, pp. 1855-1857.
Menger et al Gemini surfactants with acetylenic spacers Langmuir, vol. 16, 2000, pp. 2062-2067.
Oda et al Elongated aggregates formed by cationic gemini surfactants Langmuir, vol. 15, 1999, pp. 2384-2390.
Oude Alink Fatty acids in oil field chemicals Fatty acids in industry (Johnson and Fritz eds.), Marcel Dekker, New York, 1989, pp. 407-429.
Paubert et al Sulphonates derived from dimer acids and esters Tenside Surf. Det., 32, 1995, pp. 36-44.
Pérez et al Synthesis, aggregation and biological properties of a new class of gemini cationic amphiphilic compounds from arginine, bis(args) Langmuir, vol. 12, 1996, pp. 5296-5301.
Rosen et al Gemini surfactants J. Surfactants and Detergents, vol. 1, No. 4, 1998, pp. 547-554.
Song et al Surface properties, micellization and premicellar aggregation of gemini surfactants with rigid and flexible spacers Langmuir, vol. 12, 1996, pp. 1149-1153.
Sonntag Dehydration, pyrolysis and polymerization Fatty Acids: Their Chemistry, Properties and Uses, Part 2, $2^{nd}$ ed. (Martley ed.), Interscience Publishers, New York, 1961, pp. 1036-1054.
Zana Dimeric (gemini) surfactants Novel surfactants: preparation, applications and biodegradability (Holmberg ed.), Marcel Dekker, New York, 1998, pp. 241-277.
Zana Gemini (dimeric) surfactants Current Opinion Colloid and Interface Sci., vol. 1, 1996, pp. 566-571.
Zana et al Micellization of two triquaternary ammonium surfactants in aqueous solutions Langmuir, vol. 11, 1995, pp. 3694-3698.
Zana Physicochemical properties of dimeric surfactants in aqueous solution Structure-performance relationships in surfactants (Esumi and Ueno eds.), Marcel Dekker, New York, 1997, pp. 255-283.
Zhao et al Mixtures of monomeric and dimeric cationic surfactants J. Phys. Chem. B., vol. 102, 1998, pp. 7613-7618.
Zhu et al Double-chain surfactants with two carboxylate groups and their relation to similar double-chain compounds J. Colloid and Interface Sci., vol. 158, 1993, pp. 40-45.
Zhu et al Preparation and properties of double-chain bis (quaternary ammonium) compounds J. Japan. Oil Chem. Soc., vol. 42, No. 3, 1993, pp. 161-167.
Cates et al Statics and dynamics of worm-like surfactant micelles J. Phys. Condens. Matter, vol. 2, 1990, pp. 6869-6892.
Hoffmann et al Gels from surfactant solutions with densely packed multilamellar vesicles Faraday Discuss, vol. 101, 1995, pp. 319-333.
Przybylinski et al Field test of a unique phosphonate scale inhibitor for extended-life squeeze treatment in sandstone SPE International Symposium on Oilfield Chemistry, Houston, Texas, Feb. 16-19, 1999, SPE 50703.
Putnis et al The efficiency of a DTPA-based solvent in the dissolution of barium sulfate scale deposits SPE International Symposium on Oilfield Chemistry, San Antonio, Texas, Feb. 14-17, 1995, SPE 29094.
Rose et al Viscoelastic surfactants: rheology control without polymers or particulates Structure and Flow in Surfactant Solutions, Herb, C. A. and Prud'homme, R. K. (eds.), ACS Symposium Ser. 578, American Chemical Society, Washington D.C., 1994, pp. 352-369.
Samuel et al Polymer-free fluid for hydraulic fracturing SPE Annual Technical Conference and Exhibition, San Antonio, Texas, Oct. 5-8, 1997, SPE 38622.

\* cited by examiner (a)        (b)

(a)        (b)

```
┌─────────────────────────────┐
│ Pump scale dissolver fluid  │
│ through well bore and into  │
│ formation                   │
└─────────────────────────────┘
              │
              ▼
┌─────────────────────────────┐
│ Formation hydrocarbons      │
│ reduce viscosity of         │
│ scale dissolver             │
└─────────────────────────────┘
              │
              ▼
┌─────────────────────────────┐
│ Scale dissolver fluid       │
│ selectively invades         │
│ hydrocarbon-bearing zone    │
└─────────────────────────────┘
```

Fig. 9

VISCOELASTIC WELLBORE TREATMENT FLUID

FIELD OF THE INVENTION

The present invention relates to viscoelastic wellbore treatment fluids, and particularly treatment fluids comprising oligomeric surfactants.

BACKGROUND OF THE INVENTION

In the recovery of hydrocarbons, such as oil and gas, from natural hydrocarbon reservoirs, extensive use is made of wellbore treatment fluids such as drilling fluids, completion fluids, work over fluids, packer fluids, fracturing fluids, conformance or permeability control fluids and the like.

In many cases significant components of wellbore fluids are thickening agents, usually based on polymers or viscoelastic surfactants, which serve to control the viscosity of the fluids. Typical viscoelastic surfactants are N-erucyl-N,N-bis(2-hydroxyethyl)-N-methyl ammonium chloride and potassium oleate, solutions of which form gels when mixed with corresponding activators such as sodium salicylate and potassium chloride.

Conventional surfactant molecules are characterized by having one long hydrocarbon chain per surfactant headgroup. In the viscoelastic gelled state these molecules aggregate into worm-like micelles. Gel breakdown occurs rapidly when the fluid contacts hydrocarbons which cause the micelles to change structure or disband.

In practical terms the surfactants act as reversible thickening agents so that, on placement in subterranean reservoir formations, the viscosity of a wellbore fluid containing such a surfactant varies significantly between water- or hydrocarbon-bearing zones of the formations. In this way the fluid is able preferentially to penetrate hydrocarbon-bearing zones.

The application of viscoelastic surfactants in both non-foamed and foamed fluids used for fracturing subterranean formations has been described in several patents, e.g. EP-A-0835983, U.S. Pat. Nos. 5,258,137, 5,551,516, 5,964,295 and 5,979,557.

The use of viscoelastic surfactants for water shut off treatments and for selective acidizing is discussed in GB-A-2332224 and Chang F. F., Love T., Affeld C. J., Blevins J. B., Thomas R. L. and Fu D. K., "Case study of a novel acid diversion technique in carbonate reservoirs", Society of Petroleum Engineers, 56529, (1999).

A problem associated with the use of viscoelastic surfactants is that stable oil-in-water emulsions can be formed between the low viscosity surfactant solution (i.e. broken gel) and the reservoir hydrocarbons. As a consequence, a clean separation of the two phases can be difficult to achieve, complicating clean up of wellbore fluids. A factor promoting emulsion formation is believed to be a reduction of the oil/water interfacial energy caused by a tendency for the surfactant molecules to collect at the water/oil interface.

The recovery of hydrocarbons, such as oil and gas, from a subterranean well formation can be impeded by scales obstructing the flow of hydrocarbons from hydrocarbon-bearing zones of the formation. Typical scales are barite ($BaSO_4$) or calcite ($CaCO_3$) and it is common practice to treat these by bull-heading an aqueous-based scale dissolver fluid through a well bore and into the formation.

For example, one conventional scale dissolver for barite scale consists of a concentrated solution of potassium carbonate, potassium hydroxide and the potassium salt of ethylenediaminetetraacetic acid (EDTA), the corrosive and chelating nature of the solution being effective in removing scale. Carbonate scales may be dissolved using simple mineral acids, such as HCl.

However, hydrocarbon-producing wells often contain zones that are watered-out, producing only, or very largely, water. If the scale dissolver enters these zones, scale may also be removed therefrom. This can lead to an undesirable increase in the water cut of the fluid produced by the well.

Dimer surfactants have found some application in fluids used in the exploration and production of hydrocarbons. B. A. M. Oude Alink, "Fatty acids in oil field chemicals" in *Fatty Acids in Industry*, eds. R. W. Johnson and E. Fritz, pp. 407-429, Marcel Dekker, New York, (1989) and Henkel Corporation Chemicals Group, *Abstracts of Dimer Acid Use-Patents and Journal References*, Vol. 1, Technical Bulletin 109A, 1968 review the use of dimer oleic acids in the production of corrosion inhibitors, lubricants for water-based drilling fluids and emulsifying surfactants for invert emulsion oil-based drilling fluids. U.S. Pat. No. 4,108,779 describes the use of (apparently calcium salts of) oleic acid dimers to control the viscosity of water-in-oil spacer fluids. U.S. Pat. No. 4,607,700 and U.S. Pat. No. 5,193,618 describe the use of a dimer of an alphaolefin sulphonate surfactant to form a foam steam drive injection fluid for hydrocarbon discovery.

DEFINITIONS

The terms "carbo", "carbyl", "hydrocarbon"and "hydrocarbyl", when used herein, pertain to compounds and/or groups which have only carbon and hydrogen atoms.

The term "saturated" when used herein, pertains to compounds and/or groups which do not have any carbon-carbon double bonds or carbon-carbon triple bonds.

The term "unsaturated" when used herein, pertains to compounds and/or groups which have at least one carbon-carbon double bond or carbon-carbon triple bond.

The term "aliphatic", when used herein, pertains to compounds and/or groups which are linear or branched, but not cyclic (also known as "acyclic" or "open-chain" groups).

The term "cyclic", when used herein, pertains to compounds and/or groups which have one ring, or two or more rings (e.g., Spiro, fused, bridged). Compounds with one ring may be referred to as "monocyclic" or "mononuclear" whereas compounds with two or more rings may be referred to as "polycyclic" or "polynuclear".

The term "ring", when used herein, pertains to a closed ring of from 3 to 10 covalently linked atoms, more preferably 3 to 8 covalently linked atoms.

The term "aromatic ring", when used herein, pertains to a closed ring of from 3 to 10 covalently linked atoms, more preferably 5 to 8 covalently linked atoms, which ring is aromatic.

The term "heterocyclic ring", when used herein, pertains to a closed ring of from 3 to 10 covalently linked atoms, more preferably 3 to 8 covalently linked atoms, wherein at least one of the ring atoms is a multivalent ring heteroatom, for example, nitrogen, phosphorus, silicon, oxygen, and sulfur, though more commonly nitrogen, oxygen, and sulfur.

The term "alicyclic", when used herein, pertains to compounds and/or groups which have one ring, or two or more rings (e.g., spiro, fused, bridged), wherein said ring(s) are not aromatic.

The term "aromatic", when used herein, pertains to compounds and/or groups which have one ring, or two or more rings (e.g., fused), wherein said ring(s) are aromatic.

The term "heterocyclic", when used herein, pertains to cyclic compounds and/or groups which have one heterocyclic ring, or two or more heterocyclic rings (e.g., Spiro, fused, bridged), wherein said ring(s) may be alicyclic or aromatic.

By an "oligomeric" or "oligomer" surfactant we mean that the structure of the surfactant is based on from two to eight (and preferably two to five) linked surfactant monomer subunits, each monomer subunit having a polar head group (which may be a cationic, anionic or zwitterionic group) and a $C_{10}$-$C_{50}$ organic (i.e. aliphatic, alicyclic or aromatic) tail group bonded at a terminal carbon atom thereof to the head group. Preferably the $C_{10}$-$C_{50}$ organic tail group is a hydrocarbyl tail group. The monomer subunits are linked in the oligomer either head group-to-head group or tail group-to-tail group. When they are linked head group-to-head group, the oligomer has distinct tail groups corresponding to the tail groups of the monomer subunits and a super-head group formed from the plural head groups of the monomer subunits. When they are linked tail group-to-tail group, the oligomer has distinct head groups corresponding to the head groups of the monomer subunits and a super-tail group formed from the plural tail groups of the monomer subunits.

Although the oligomer is defined above in relation to a chemically-corresponding monomer subunit, in practice the oligomer surfactant may not necessarily be synthesised from that monomer. For example, a synthesis route may be adopted in which monomer subunits are first oligomerised and the head groups are then changed to those of the desired oligomer surfactant. That is the head groups of the monomer subunits used in practice to form the oligomer may be different from the head groups of the monomer subunits to which the oligomer chemically corresponds. In another example, if the tail groups of the monomers actually used to form the oligomer are unsaturated, the oligomerisation process may involve the partial or total hydrogenation of those groups, particularly if the tail groups are linked in the oligomer.

Furthermore the tail groups of the monomer units actually used to form the oligomer may be aliphatic, but if the monomer units are linked in the oligomer tail group-to-tail group, the links formed between the tail groups in the super-tail group may be aliphatic, alicyclic or aromatic.

By a "viscoelastic" fluid we mean that the elastic (or storage) modulus G' of the fluid is equal to or greater than the loss modulus G" as measured using an oscillatory shear rheometer (such as a Bohlin CVO 50) at a frequency of 1 Hz and at 20° C. The measurement of these moduli is described in *An Introduction to Rheology*, by H. A. Barnes, J. F. Hutton, and K. Walters, Elsevier, Amsterdam (1997).

By "straight chain" we mean a chain of consecutively linked atoms, all of which or the majority of which are carbon atoms. Side chains may branch from the straight chain, but the number of atoms in the straight chain does not include the number of atoms in any such side chains.

SUMMARY OF THE INVENTION

We have found that oligomer surfactants can be used to form viscoelastic wellbore treatment fluids with distinctive and useful properties.

In a first aspect the present invention provides a viscoelastic wellbore treatment fluid comprising an effective amount of an oligomeric surfactant for controlling the viscoelasticity of the fluid. Preferably, the viscoelasticity of the fluid is maintained up to at least 50° C.

We have found that surfactants of this type are particularly suitable for use as wellbore thickening agents. The surfactants form aqueous viscoelastic solutions via micellar aggregation but have a reduced tendency, compared with monomeric surfactants, to locate at the oil/water interface. That is, the oligomeric surfactant molecules are less surface active and so do not reduce the oil/water interfacial energy to the same extent. This helps to inhibit the formation of oil/water emulsions and promotes oil and water separation.

Compared with monomeric surfactants, oligomeric surfactants also tend to have higher viscosities at higher temperatures. So the useful working temperatures of wellbore treatment fluids based on viscoelastic sufactants can be increased.

Another advantage of these surfactants is that they generally provide higher viscosities per unit weight of surfactant than the corresponding monomers. So less surfactant may be needed for a particular task which reduces e.g. materials, transportation and storage costs. In one embodiment the treatment fluid comprises less than 10 percent by weight of oligomeric surfactant. It may comprise less than five and preferably less than three percent by weight of oligomeric surfactant. In general we have found that, compared to the corresponding monomer surfactant, approximately half the amount by weight of an oligomer surfactant is needed to produce a treatment fluid with similar performance characteristics.

Preferably the viscosity of the treatment fluid is breakable on contact with hydrocarbons, such as kerosene, so that the viscosity at 20° C. is reduced by at least 80%. Although breaking may be demonstrated by contacting equal volumes of treatment fluid and oil, the skilled person knows that solutions based on viscoelastic surfactants are generally breakable by relatively small amounts of oil, breaking being a complex process typically involving molecular rearrangement and larger scale fluid fingering processes. H. Hoffmann and G. Ebert in "Surfactants, micelles and Fascinating Phenomena", *Angew. Chem. Int. Ed. Engl.*, 27, 902-912 (1988) provide a discussion of breaking phenomena.

The structure of the oligomeric surfactant may be based on linked surfactant monomer subunits, each monomer subunit having the formula $(R_1-X)_p Z_m$ or $R_1-Y$; wherein X is a charged head group, Z is a counterion, p and m are integers which ensure that the surfactant monomer is charge neutral, Y is a zwitterionic polar headgroup (such as $-N^+(CH_3)_2-CH_3-COO^-$ or $-N^+(CH_3)_2-CH_3-OSO_3^-$), and $R_1$ is a $C_{10}$-$C_{50}$ organic (preferably hydrocarbyl and/or aliphatic) tail group comprising a $C_{10}$-$C_{25}$ (preferably $C_{15}$-$C_{24}$) straight chain bonded at a terminal atom thereof to respectively X or Y.

The oligomeric surfactant may be formed in situ from the corresponding oligomeric acid precursor. The organic tail group may comprise only the straight chain. The straight chain may be a hydrocarbyl chain. In one embodiment the monomer straight chain is unsaturated. Preferably the oligomer is a dimer or a trimer.

Preferably X is a carboxylate ($-COO^-$), sulphate ($-OSO_3^-$), sulphonate ($-SO_3^-$), phosphate ($-OPO_3^{2-}$), or a phosphonate ($-PO_3^{2-}$) charged group. Z may be an alkali metal counterion. For the avoidance of doubt, it is hereby mentioned that when X is a carboxylate group the carbon atom of the carboxylate group is not counted with the carbon atoms of the organic tail group. The surfactant monomer may be a salt of oleic acid.

Alternatively X may be a quaternary ammonium ($-NR_2R_3R_4^+$) charged group; $R_2$, $R_3$ and $R_4$ being $C_1$-$C_6$ aliphatic groups, or one of $R_2$, $R_3$ and $R_4$ being a $C_1$-$C_6$ aliphatic group and the others of $R_2$, $R_3$ and $R_4$ forming a five- or six-member heterocylic ring with the nitrogen atom. In one embodiment the monomer units are linked tail group-to-tail group, and preferably straight chain-to-straight chain, in the oligomer. Preferably, $R_2$, $R_3$ and $R_4$ are each and independently a $-CH_3$, $-CH_2CH_3$, $-CH_2CH_2CH_3$, $-CH(CH_3)_2$, —CH₂OH, —CH₂CH₂OH, —CH₂CH₂CH₂OH, —CH₂CH(OH)CH₃, —CH(OH)CH₂CH₃, —CH(CH₂OH)CH₃ or —C(CH₃)₂OH group. $R_1$ may be an erucyl group or an oleyl group. Z may be a halide anion such as Cl⁻ or Br⁻, or an organic anion with a molecular weight of less than 300 such as salicylate or octyl sulphate.

In one embodiment the complete oligomer can be defined by the formula $(R_1R_2R_3N^+—(—R_5—N^+(R_1R_4)—)_n—R_5—N^+R_1R_2R_3)\cdot_{(n+2)}Z^-$ where n=0, 1, 2 or 3, and $R_5$ comprises a $C_1$-$C_{12}$ aliphatic group (and is preferably a hydrocarbyl chain and more preferably an unbranched $C_1$, $C_2$, $C_3$, $C_4$, $C_5$ or $C_6$ aliphatic chain) or a $C_5$-$C_{12}$ aromatic or alicyclic group.

The treatment fluid may further comprise an effective amount of a monomeric surfactant for controlling the viscoelasticity of the fluid. Generally, monomeric surfactants generate maximum viscosities at relatively low temperatures, while oligomeric surfactants generate maximum viscosities at relatively high temperatures. So by adjusting the relative amounts of the oligomeric and monomeric surfactants the rheological behaviour of the fluid can be predetermined or controlled. The relative amounts of the oligomeric and monomeric surfactants may be adjusted so that the viscosity of the treatment fluid, as measured using a steady shear rheometer (such as a Bohlin CVO 50) at a shear rate of 100 s⁻¹, is at least 10 cP for all temperatures in the range 80 to 260° F. (26.5 to 126.5° C.), and is preferably at least 50 cP for all temperatures in the range 120 to 260° F. (49 to 126.5° C.).

In various embodiments the treatment fluid is, or is used as, respectively a fracturing fluid, a water shut-off treatment fluid, or a selective acidizing fluid.

In a particular embodiment the treatment fluid is a scale dissolver fluid for dissolving scale in a subterranean hydrocarbon-bearing formation, the fluid further comprising an effective amount of a scale dissolver formulation, whereby, in use, formation hydrocarbons act on the surfactant to reduce the viscosity of the fluid so that the fluid selectively invades a hydrocarbon-bearing zone of the formation. In particular, the surfactant of the scale dissolver fluid may comprise a salt of an oligomer of oleic acid as described in earlier application GB 0019380.5.

In use, the fluid of this embodiment is injected into the subterranean formation in a relatively viscous state. If the injected fluid contacts a watered-out zone of the formation the viscous nature of the fluid remains essentially unaltered and, to a significant extent, the fluid is prevented from entering the watered-out zone, i.e. the fluid locally has limited injectivity. Conversely, if the fluid contacts a hydrocarbon-bearing zone of the formation the viscosity is locally significantly reduced and the fluid is able to penetrate the hydrocarbon-bearing zone.

Therefore, the difference in viscosity of the fluid when in contact with hydrocarbons and water advantageously allows a selective placement of the scale treatment, and as a result scale may be preferentially removed from hydrocarbon-bearing zones. This can lead to a stimulation of hydrocarbon production without a substantial increase in the water cut of produced fluids.

Preferably the scale dissolver formulation activates the production of viscoelasticity by the surfactant. In this way it may not be necessary to add additional agents, such as KCl brine, to activate the production of viscoelasticity. However, the use of such additional agents is not excluded by the present invention. The scale dissolver formulation may comprise any acid or alkaline solution that dissolves minerals and other wellbore deposits (including organic deposits). Desirably the scale dissolver formulation comprises an aqueous solution of at least one of an alkali metal carbonate, alkali metal hydroxide, EDTA and an alkali metal salt of EDTA. The alkali metal may be potassium. Alternatively the scale dissolver formulation may comprise a mineral acid, such as HCl.

A second aspect of the present invention provides a method of dissolving scale in a subterranean formation with at least one hydrocarbon-bearing zone, the method including pumping the scale dissolver fluid of the particular embodiment of the first aspect of the invention through a wellbore and into the subterranean formation, the viscosity of the scale dissolver fluid being reduced by formation hydrocarbons so that the fluid selectively invades the hydrocarbon-bearing zone of the well to dissolve scale in the hydrocarbon-bearing zone.

A third aspect of the present invention provides a method of injecting a scale dissolver fluid into a subterranean formation with at least one hydrocarbon-bearing zone, the method including the step of pumping the scale dissolver fluid of the particular embodiment of the first aspect of the invention through a wellbore and into the subterranean formation.

BRIEF DESCRIPTION OF THE DRAWINGS

Specific embodiments of the present invention will now be described with reference to the following drawings in which:

FIG. 9 shows schematically the steps involved in deploying a scale dissolver fluid of the present invention, FIGS. 10a and b show respectively dimers of N-erucyl-N,N-bis(2-hydroxyethyl)-N-methylammonium chloride and N-oleyl-N,N-bis(2-hydroxyethyl)-N-methylammonium chloride.

DETAILED DESCRIPTION

Viscoelastic solutions of both anionic and cationic oligomeric surfactants were investigated.

A controlled stress rheometer (Bohlin model type CVO-50) was used to measure the Theological properties of the solutions. Using a concentric cylinders (Couette) geometry (inner radius of the outer cylinder, $R_i$=1.375 cm, outer radius of the inner cylinder, $R_o$=1.25 cm, and inner cylinder length=3.78 cm), corresponding to the geometry of German DIN standard 53019, the viscosity of each solution was measured at several applied shear stresses within a specified range. The typical range of shear stress was 0.5-40 Pa corresponding to a shear rate range of 0.005 to 1000s$^{-1}$. Measurements were made at increasing and then decreasing shear rate. Typically, the complete set of measurements consisted of 40 viscosity measurements, each taken after a delay time of 10 seconds at constant shear stress and shear rate.

For the particular geometry of the rheometer, the shear rate was calculated as:

$$\dot{\gamma} = \frac{RPM \cdot 2\pi}{60} \frac{2 \cdot R_i^2 R_o^2}{\left(\frac{R_i + R_o}{2}\right)^2 (R_o^2 - R_i^2)},$$

where RPM is the rotational speed (in revolutions per minute) of the inner cylinder. The viscosity was then obtained for each measurement by dividing the measured stress by the calculated shear rate.

Oligomeric Anionic Surfactants

The oligomerisation of oleic acid generally leads to the production of complex mixtures of dimeric and trimeric products. Commercially available oligomers, such as the Empol™ series of dimers and trimers from Henkel Corporations Chemical Group (4900 Este Avenue-Bldg 53, Cincinnati, Ohio 45232, USA) are suitable for putting the present invention into operation. Alternative suppliers of suitable mixtures are e.g. Uniqema (PO Box 90, Wilton Center, Middleborough, Cleveland TS90 8JE, UK), Union Camp (Vigo Lane, Chester-le-Street. Co. Durham DH3 2RB, UK) and Expo Chemical Company Inc. (12602 Manorwood, Cypress (Houston), Tex. 77429, USA). FIGS. 1a-e show typical chemical structures of dimeric components of these mixtures. Clearly the components have different degrees of hydrogenation.

Dimer anionic surfactants were generated from the potassium salts of commercially available oleic acid dimer mixtures (although for convenience the mixtures will be referred to as if they were individual dimers). In the absence of electrolyte (such as potassium salts), solutions of the potassium oleate oligomers containing up to 6 weight percent surfactant were found to form low viscosity liquids. However, in the presence of potassium salts, such as potassium chloride, the solutions become viscoelastic and readily formed strong gels.

The potassium oleate oligomer surfactants were made directly in aqueous solution by the addition of the liquid oligomer acid to a solution of potassium hydroxide. The extent of the reaction was monitored by measuring pH, substantially fully converted potassium oleate oligomer solutions having a pH in the range 8-9.

Figure 1:
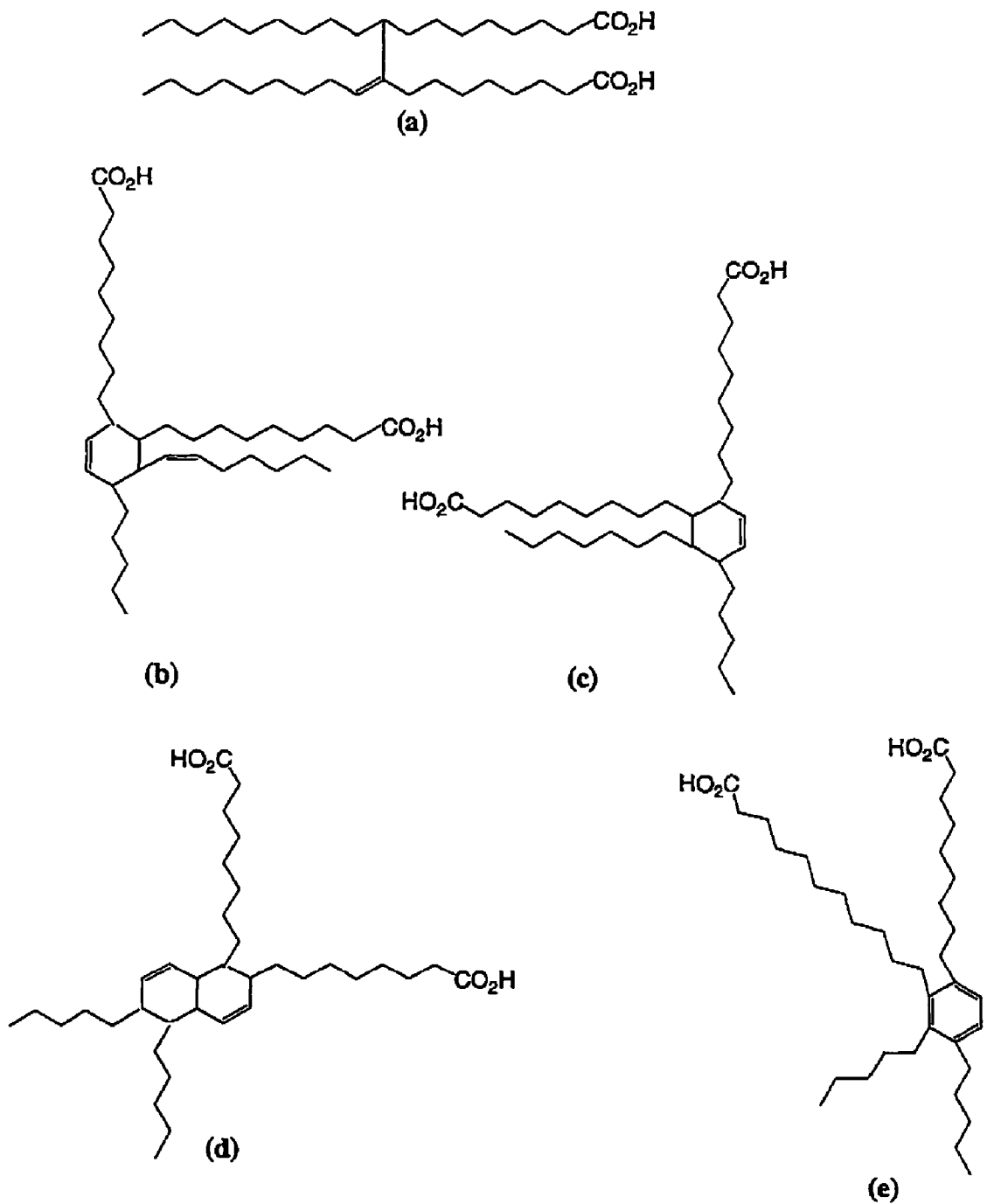
FIGS. 1a-e show typical chemical structures of dimeric components of oleic acid oligomer mixtures, FIG. 2 compares the temperature dependencies of the viscosities (at a shear rate of 100 s⁻¹) of 2.25, 3 and 4.5 weight percent aqueous solutions of three potassium oleate dimers (E1016, E1018 and U1009), each solution containing 8 weight percent potassium chloride.
Figure 2:
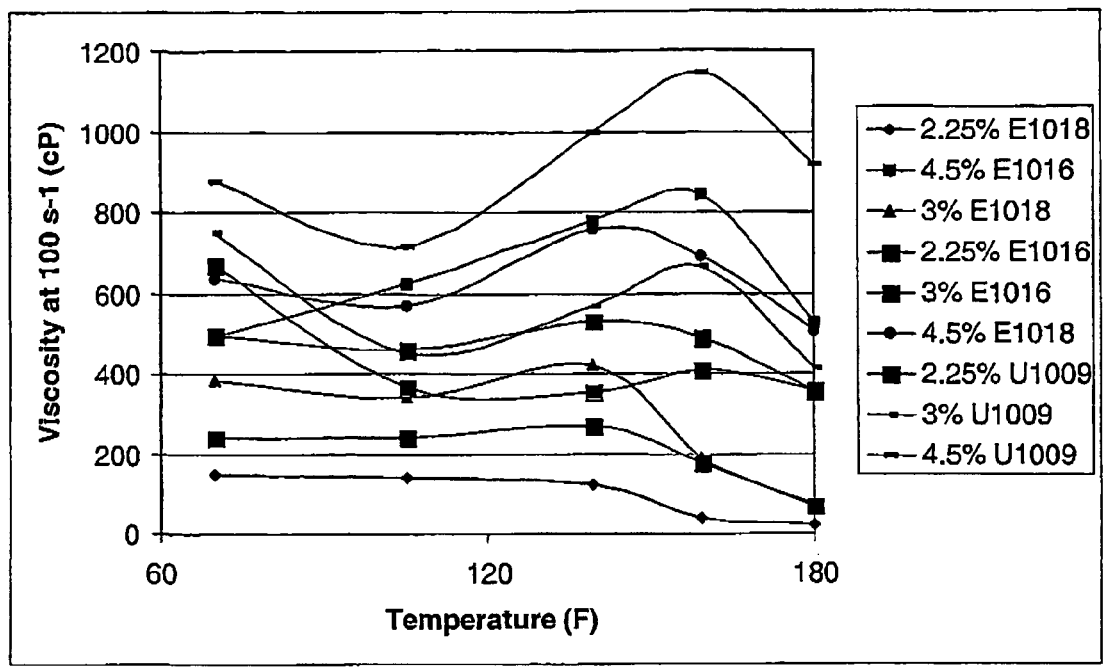

FIG. 2 compares the measured viscosities (at a shear rate of 100 s$^{-1}$) of 2.25, 3 and 4.5 weight percent aqueous solutions of three potassium oleate dimers, each solution containing 8 weight percent potassium chloride. The labels E1016 and E1018 refer to the trade names of the oleic acid dimers, Empol™ 1016 and Empol™ 1018, produced by the Henkel Corporation, while U1009 refers to a hydrogenated oleic acid dimer produced by Uniqema. E1016 contains a relatively high amount of aliphatic super-tail group (i.e. non-head group) structures, while E1018 has a larger amount of alicyclic and aromatic super-tail group structures.

The solutions of the potassium salt of the hydrogenated oleic acid dimer U1009 were significantly more viscous than the corresponding solutions formed from E1016 and E1018. This is believed to be due to the higher degree of saturation of the U1009 super-tail group.

Figure 3:
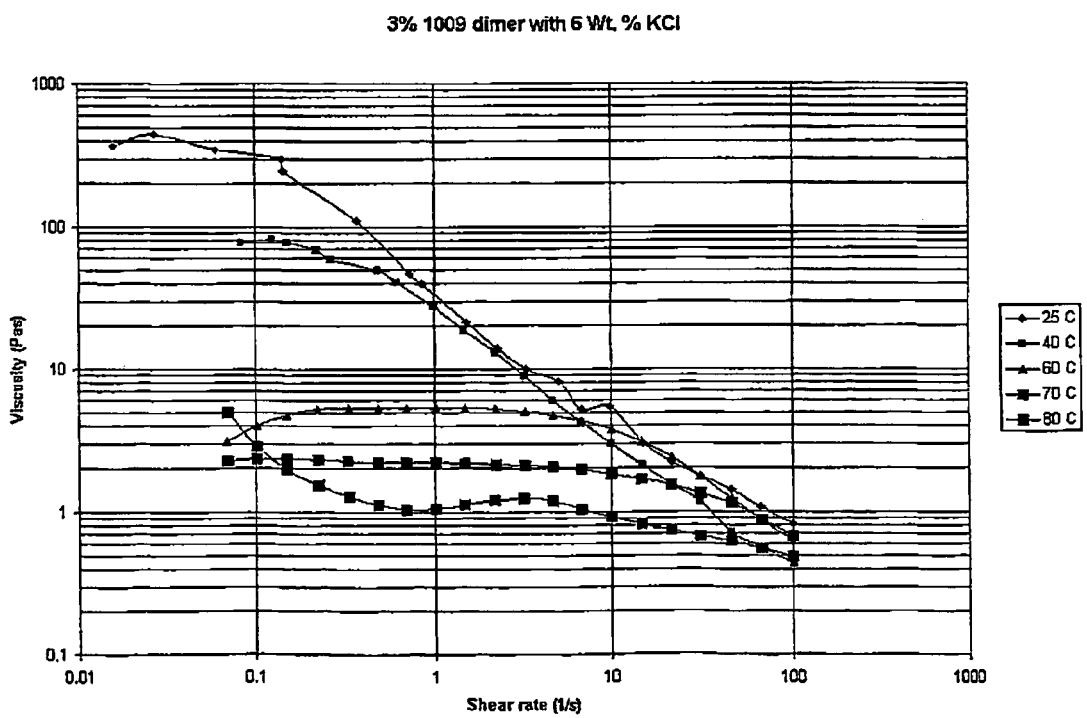
FIG. 3 shows the dependence, at five temperatures in the range 25-80° C., of the viscosity on shear rate of a solution containing 3 weight percent of the potassium salt of U1009 and 6 weight percent of potassium chloride.

FIG. 3 shows the dependence of the measured viscosity of a solution of the potassium salt of U1009 (3 weight percent) with potassium chloride (6 weight percent) on shear rate at five temperatures in the range 25-80° C. At ambient temperature and at low shear rates the viscosity of the solution was in excess of 100 poise, although the viscosity decreased sharply with increasing shear rate. At higher temperatures the viscosity was significantly less dependent on shear rate and approached Newtonian behaviour.

Figure 4:
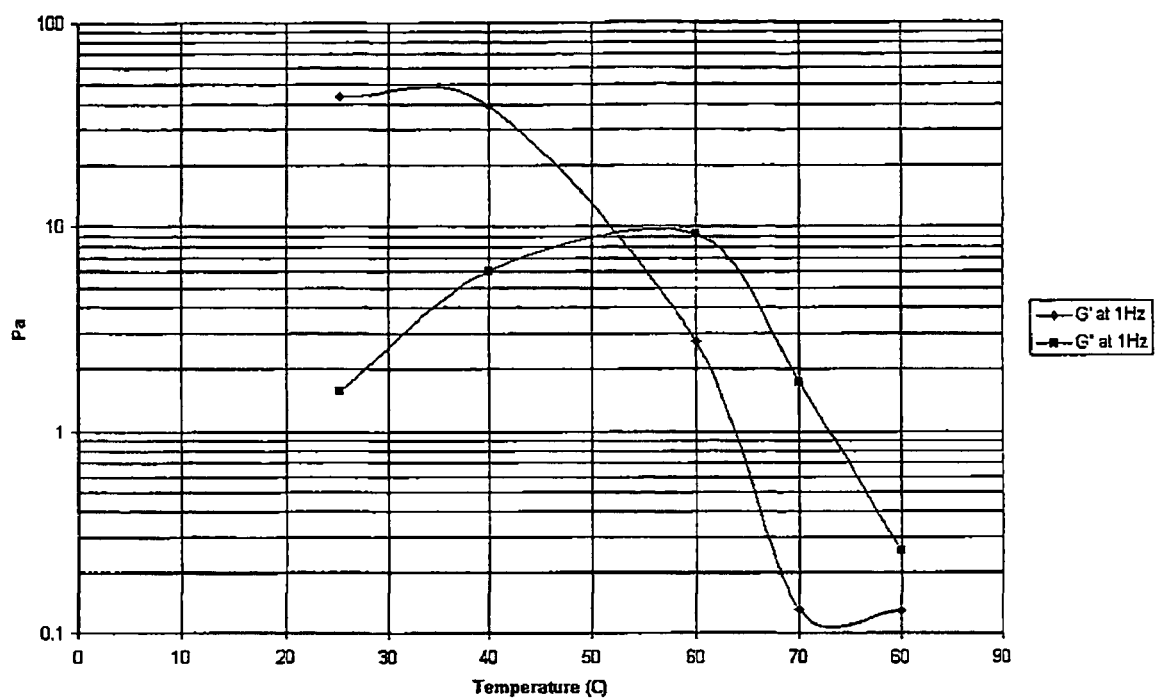
FIG. 4 shows the temperature dependence of the storage (G') and loss (G'') moduli of the solution of FIG. 3 measured at an oscillatory frequency of 1 Hz.

FIG. 4 shows the temperature dependence of the storage (G') and loss (G") moduli of the same solution measured at an oscillatory frequency of 1 Hz. When the temperature was below about 50° C., G'>G" and the solution was viscoelastic. Above this temperature the loss modulus dominated and the solution became predominantly viscous. The temperature at which the solution lost its viscoelasticity corresponded to that at which the viscosity lost its marked dependence on shear rate.

Figure 5:
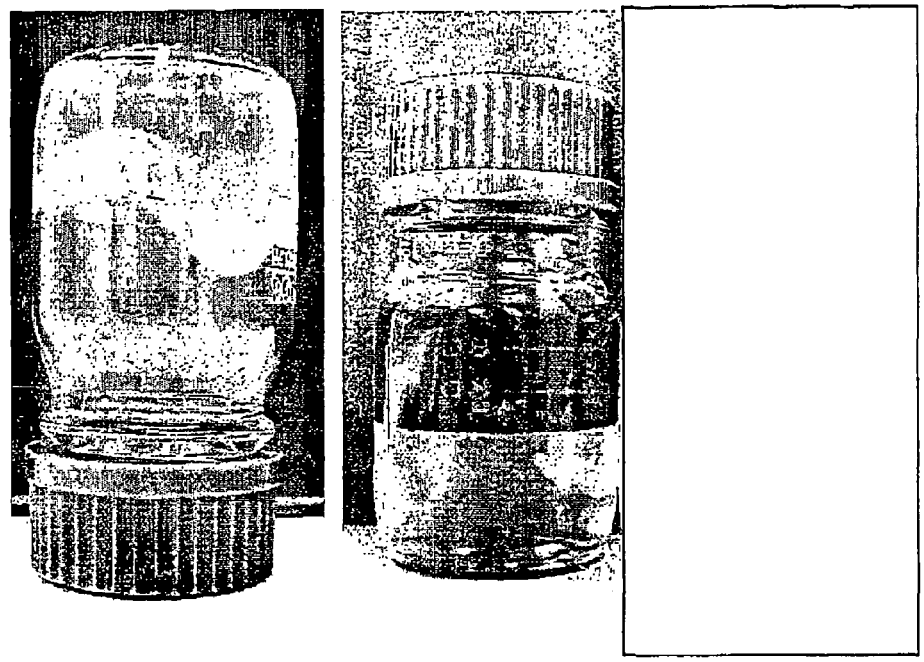
FIG. 5a shows an inverted bottle containing a gel formed from the solution of FIG. 3.
FIG. 5b shows a bottle containing the same gel after shaking with an equal volume of kerosene.

The viscosities of the solutions of the potassium oleate dimers, gelled by the addition of potassium salts, were reduced on contact with hydrocarbons. FIG. 5a shows a bottle containing the solution of the potassium salt of U1009 (3 weight percent) with potassium chloride (6 weight percent). The surfactant solution formed a rigid gel as evidenced by the retention of the solution at the base of the bottle even when the bottle was inverted. FIG. 5b shows a bottle containing the same gel after shaking with an equal volume of kerosene (dyed red to aid contrast). The viscoelasticity of the solution was destroyed by contact with the hydrocarbon and the kerosene floated on the surfactant solution. The surfactant solution and the kerosene did not form a stable emulsion. Similar tests were performed using both aliphatic and aromatic hydrocarbons, including pure aromatic hydrocarbons such as toluene and xylene. The tests showed that the lack of stable emulsion formation between the oligomer solutions and the hydrocarbons is a characteristic property of these surfactants.

Figure 6:
FIG. 6a shows a solution containing 3 weight percent of oleic acid dimer E1018 and 8 weight percent potassium chloride to which solution has been added an equal quantity of a 500 ppm (0.013 molar) aqueous solution of calcium ions.
FIG. 6b shows the same mixture of solutions but with the F1018 dimer replaced with E1016.

Solutions of the potassium oleate dimers were observed to respond to the addition of soluble calcium ions in different ways. This is significant because $Ca^{2+}$ ions are often found in mixed and formation water. FIG. 6b shows a copious fine white precipitate which developed when a solution consisting of 3 weight percent of oleic acid dimer E1016 and 8 weight percent potassium chloride was mixed with an equal quantity of a 500 ppm (0.013 molar) aqueous solution of calcium ions. In contrast, when the corresponding experiment was performed on dimer E1018 (FIG. 6a) only a few large pieces of white precipitate developed and the solution maintained its clarity. The hydrocarbon chains of E1018 are more unsaturated than those of the E1016, which indicates that higher degrees of saturation may be advantageous when the mixed or formation water contains significant levels of dissolved calcium. In contrast, the cationic surfactants discussed below were relatively unaffected by dissolved calcium.

Dimer acids were also used to form scale dissolver fluids. A scale dissolver fluid of the present invention has enhanced rheological performance which allows it to dissolve scales preferentially in hydrocarbon-bearing matrices of subterranean formations. To a significant extent this performance is due to the ability of the fluid to vary its viscosity depending on whether it is in contact with water or hydrocarbons. In contrast, conventional scale dissolver fluids remove scale deposits indiscriminately from hydrocarbon and water-bearing zones alike.

If the scale dissolver fluid is considered as a combination of a conventional scale dissolver fluid and the surfactant, the viscosity of the gel can be reduced to substantially that of the conventional fluid when the gel comes into contact with hydrocarbons, making the scale dissolver formulation of the fluid readily injectable into hydrocarbon-bearing matrices. However, when the gel contacts water it remains highly viscous (and therefore not easily injectable), any reduction in viscosity being essentially due to dilution. Effectively the highly viscous gel acts as a diverting agent and allows a high proportion of the scale dissolver formulation to be placed in hydrocarbon zones.

Scale dissolver fluid example 1: EDTA (13 g), potassium hydroxide (11.25 g) and potassium carbonate (2.25 g) were dissolved in water (70.5 g), and E1016 oleic acid dimer (3 g) was then added and the mixture stirred until it became a homogeneous gel.

Scale dissolver fluid example 2: EDTA (8.66 g), potassium hydroxide (7.5 g) and potassium carbonate (1.5 g) were dissolved in water (79 g), and Empol™ 1043 oleic acid trimer (3 g) was then added and the mixture stirred until it became a homogeneous gel.

Figure 7:
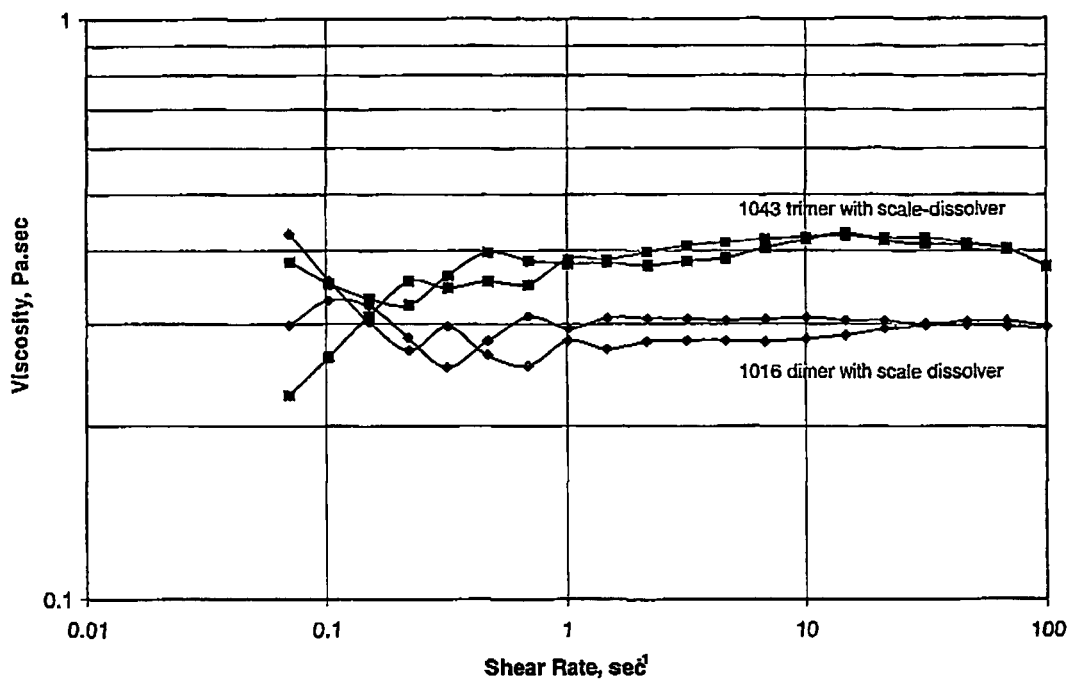
FIG. 7 shows a graph comparing the rheology of two scale dissolver fluids comprising oleic acid oligomers at 60° C.

The viscosities of the gels of examples 1 and 2 were measured at 60° C. over a range of shear rates. The results of these measurements are shown in FIG. 7. Both gels exhibited Newtonian rheology over a surprisingly wide range of shear rates. Advantageously, therefore, the injectivity of the gels into subterranean matrices should not be affected by changes in shear rate which may occur during the placement process.

A 150 cP gel based on the formulation of example 1 was injected into an oil-saturated core and a water-saturated core by forcing the gel down a supply line which branched into two parallel lines leading to the two cores. Both cores were of Bentheimer sandstone and had equal total pore volumes. By measuring the relative amounts of gel entering the two cores at a given supply pressure or for a given volume of supplied gel, the relative injectivities of the gel through the two cores was determined.

Figure 8:
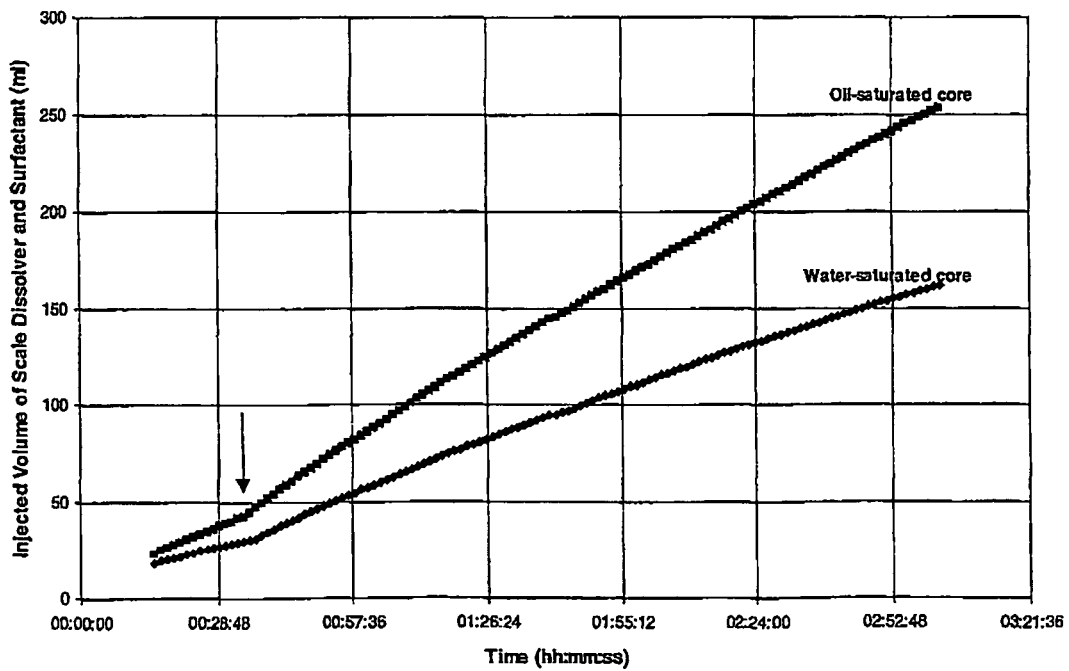
FIG. 8 shows a graph comparing the injectivities into oil and water-saturated cores of a scale dissolver fluid.

Injection profiles of the gel into the two cores with the fluid and cores maintained at a temperature of 60° C. are shown in FIG. 8. The permeability of the water-saturated core was 1.6 darcies while that of the oil-saturated core was 1.4 darcies; both cores had a porosity of 22%. The profiles demonstrate that the volume of gel entering the oil-saturated core is approximately 50% greater than that entering the water-saturated core. The preference of the gel to enter the oil-saturated core is maintained even after a large number of pore volumes was passed through the two cores. The viscosity of the effluent from the oil-saturated core was significantly lower than that of the injected gel throughout the duration of the experiment and demonstrated that the surfactant gel was continually mix with oil. In contrast, the viscosity of the effluent from the water-saturated core was similar to that of the injected gel. Higher viscosity fluids enhance this contrast and fluids can be developed that only enter oil-bearing zones, the viscosity being too high for injection into the water-bearing zones.

FIG. 9 shows schematically the steps involved in the deployment of a scale dissolver fluid of the present invention.

Oligomeric Cationic Surfactants

Figure 10:
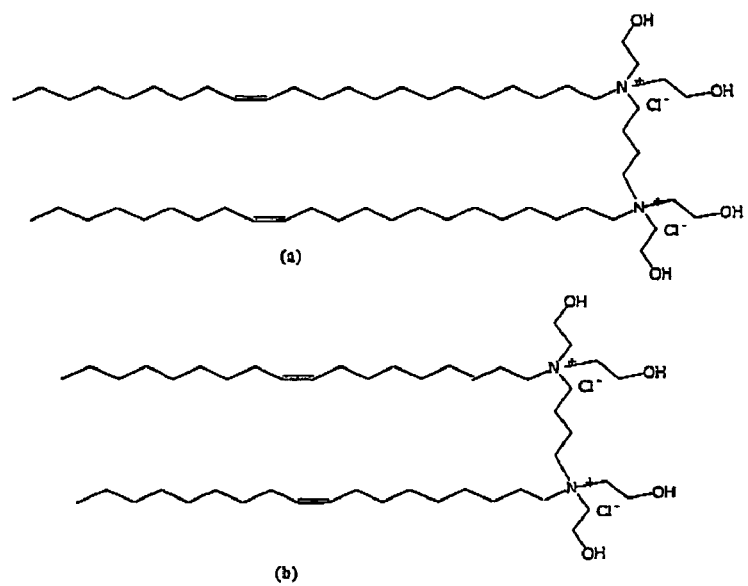

A dimer of N-erucyl-N,N-bis(2-hydroxyethyl)-N-methylanmonium chloride (FIG. 10a) was synthesized by linking the head groups via a $C_4$ bridge.

Figure 11:
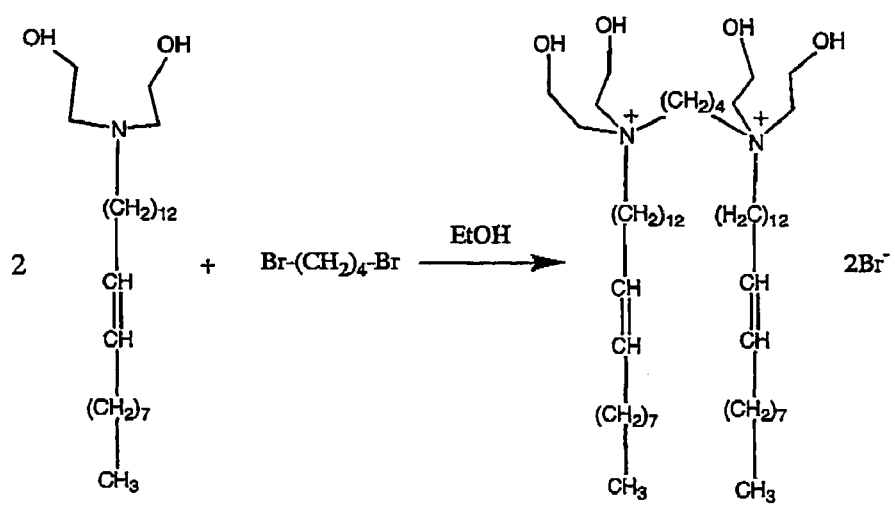
FIG. 11 shows the reaction used to synthesise N-erucyl-N,N-bis(2-hydroxyethyl)-N-methylammonium chloride.

FIG. 11 shows the reaction used to synthesise the dimer. To a mixture of bis(hydroxyethyl)erucyl amine (50.00 g, 123.2 mmol) and 1,4-dibromobutane (12.97 g, 60.08 mmol) was added 100 g of ethanol as solvent. The reaction was carried out under reflux and was monitored by titration and Thin Layer Chromatograph (TLC). TLC plates, under UV light, showed the formation of a single product and the disappearance of the starting material. The reaction was stopped when both the acid titration and TLC results indicated completion of the reaction (after 24 hours). The solvent was removed under vacuum. A light yellow waxy solid was collected as the product.

Figure 12:
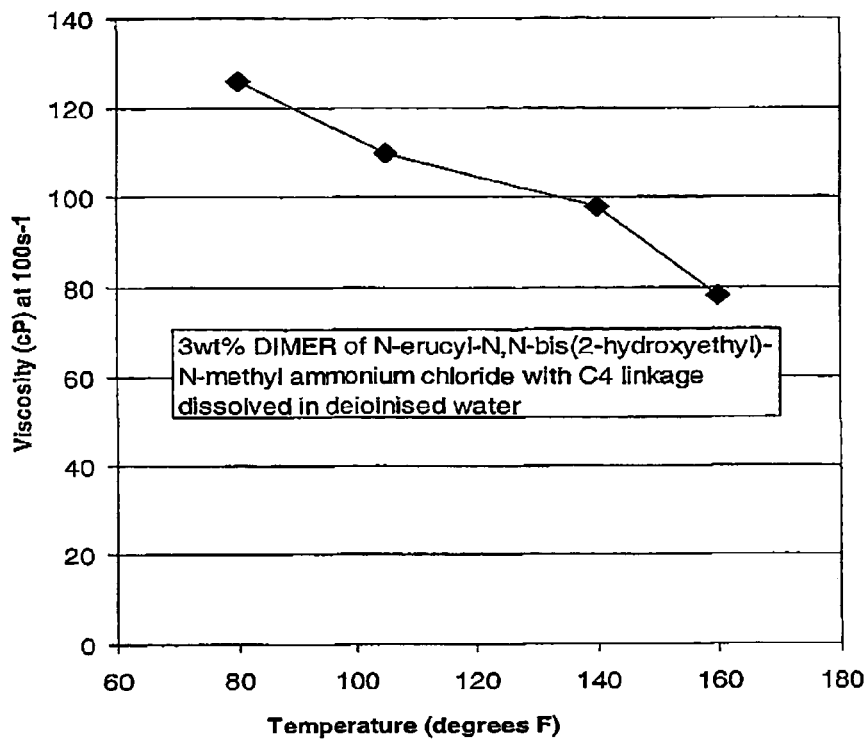
FIG. 12 shows a graph of viscosity against temperature for a 3 weight percent solution of dimeric N-erucyl-N,N-bis(2-hydroxyethyl)-N-methylammonium chloride in de-ionized water.

The monomeric surfactant, N-erucyl-N,N-bis(2-hydroxyethyl)-N-methylammonium chloride, does not form a gel in de-ionized water, and requires at least 0.2 mol/L chloride to induce gelation and the range 0.3 to 0.5 mol/L chloride to reach the maximum viscosity. In contrast, a solution containing 3 weight percent of the corresponding dimer surfactant in de-ionized water was viscoelastic, the viscosity remaining relatively constant over the temperature range of 80 to 160° F. (26.5 to 71° C.), as shown in FIG. 12.

Figure 13:
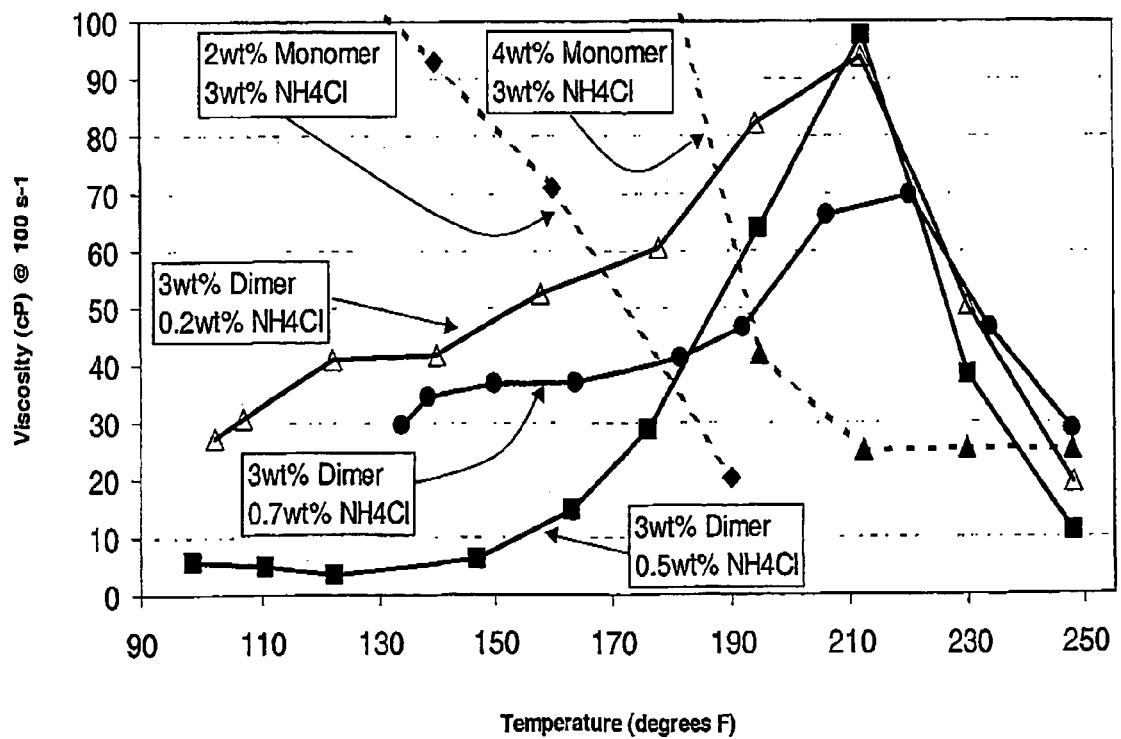
FIG. 13 shows graphs of viscosity against temperature for solutions containing 3 weight percent of dimeric N-erucyl-N,N-bis(2-hydroxyethyl)-N-methylammonium chloride and respectively 0.2, 0.5 and 0.7 weight percent of NH$_4$Cl, and solutions containing respectively 2 and 4 weight percent of monomeric N-erucyl-N,N-bis(2-hydroxyethyl)-N-methylammonium chloride and 3 weight percent of NH$_4$Cl.

For a solution containing 3 weight percent of the dimer of N-erucyl-N,N-bis(2-hydroxyethyl)-N-methylammonium chloride and 0.2-0.5 weight percent $NH_4Cl$, a maximum in the viscosity measured was observed at 215cF (101.5° C.) (FIG. 13). When the concentration of $NH_4Cl$ was raised to 0.7 weight percent, the maximum shifted to 220° F. (104.5° C.). The dimer formulations had a viscosity in excess of 50 cP in the temperature range 190 to 230° F. (88 to 110° C.), whereas the viscosity of the 2 wt % and 4 wt % monomer formulations fell below 50 cP at 175 and 190° F. (79.5 and 88° C.), respectively (FIG. 13).

In general, the dimer-based formulations containing $NH_4Cl$ had lower viscosities at the lower temperatures compared with the formulations based on the monomer. This indicates that treatment fluids based on such dimer surfactants should be more manageable on surface (i.e. at the well head).

Improved high temperature rheology was obtained by blending the dimer with the monomer. Some typical results are presented in FIG. 14. In general, solutions containing mixtures of dimer and monomer showed reduced viscosities at the lower temperatures and enhanced viscosity at temperatures above 150° F. (65.5° C.), compared with solutions based only on the monomer. For example, a solution containing 2 weight percent dimer, 1 weight percent monomer and 1 weight percent $NH_4Cl$ solution had a low viscosity (measured at 100 $s^{-1}$) at 80° F. (26.5° C.), but maintained a viscosity >50 cP (at 100 $s^{-1}$) in the broad temperature range 110 to 260° F. (43.5 to 126.5° C.). By comparison, the viscosity of a solution containing 4 weight percent monomer and 3 weight ammonium chloride fell below 50 cP when the temperature was increased above around 190° F. (88° C.). The comparison clearly demonstrates the advantage of using the dimeric surfactant in combination with the monomeric surfactant for fracturing or other applications in high temperature environments.

We also found that the improved high temperature viscosifying performance of the dimer/monomer blend was achieved using a lower total concentration of surfactant and lower inorganic brine ($NH_4Cl$) concentration as compared to the monomer-only formulation.

The dimer of N-oleyl-N,N-bis(2-hydroxyethyl)-N-methylammonium chloride (FIG. 10b), was also synthesised by linking the head groups with a $C_4$ bridge. This dimeric surfactant is a white solid at room temperature, and is poorly soluble in water at room temperature. However, the solubility of this surfactant increases with increasing temperature.

It was discovered that the N-oleyl-N,N-bis(2-hydroxyethyl)-N-methylammonium chloride diner could be solubilised by blending it with the N-erucyl-N,N-bis(2-hydroxyethyl)-N-methylammonium chloride monomer. The viscosity versus temperature profiles for a solution containing 1 wt % oleyl-dimer and 3 wt % erucyl-monomer is compared to a solution containing 4 wt % erucyl-monomer in FIG. 15. The dimer/monomer blend showed reduced viscosity at the lower temperatures up to around 140° F. (60° C.) as compared to the solution of erucyl-monomer. Again this indicates that a treatment fluid based on such a dimer/monomer blend should be relatively manageable under surface conditions.

Also the viscosity of the dimer/monomer blend at temperatures above about 140° F. (60° C.) was greater than that of the erucyl-monomer solution, which again indicates that a treatment fluid based on the dimer/monomer blend is applicable under a greater range of down hole temperatures, particularly, in this case, for the range 140 to 210° F. (60 to 99° C.), compared to a fluid based on a solution containing only the monomer.

Figure 14:
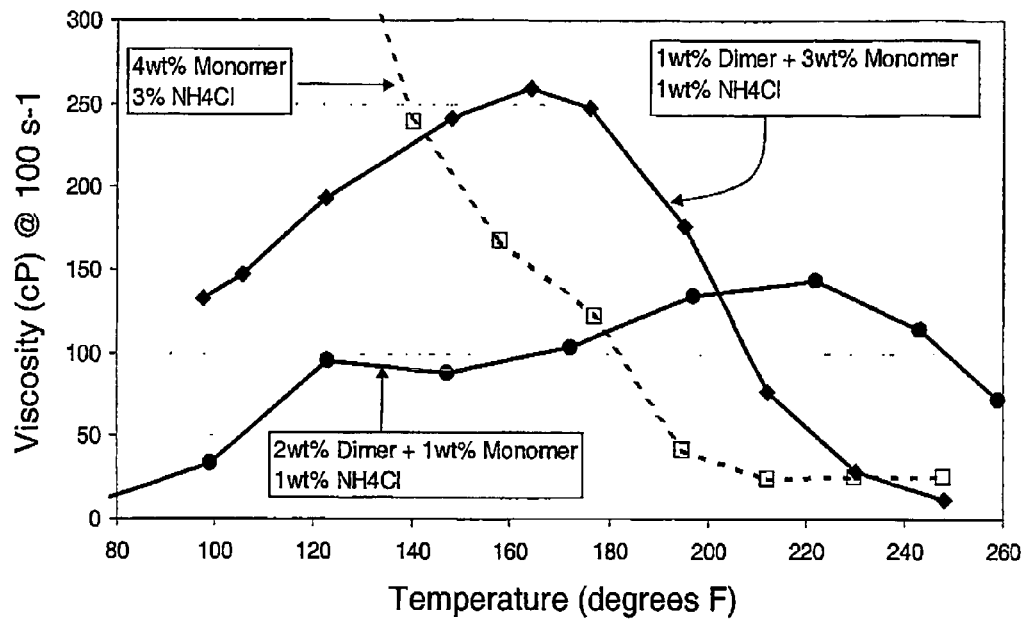
FIG. 14 shows graphs of viscosity against temperature for solutions containing 4 weight percent of monomeric N-erucyl-N,N-bis(2-hydroxyethyl)-N-methylammonium chloride and 3 weight percent of NH$_4$Cl; 1 weight percent of dimeric N-erucyl-N,N-bis(2-hydroxyethyl)-N-methylammonium chloride and 3 weight percent of monomeric N-erucyl-N,N-bis(2-hydroxyethyl)-N-methylammonium chloride; and 2 weight percent of dimeric N-erucyl-N,N-bis (2-hydroxyethyl)-N-methylammonium chloride, 1 weight percent of monomeric N-erucyl-N,N-bis(2-hydroxyethyl)-N-methylammonium chloride and 1 weight percent of NH$_4$Cl.
Figure 15:
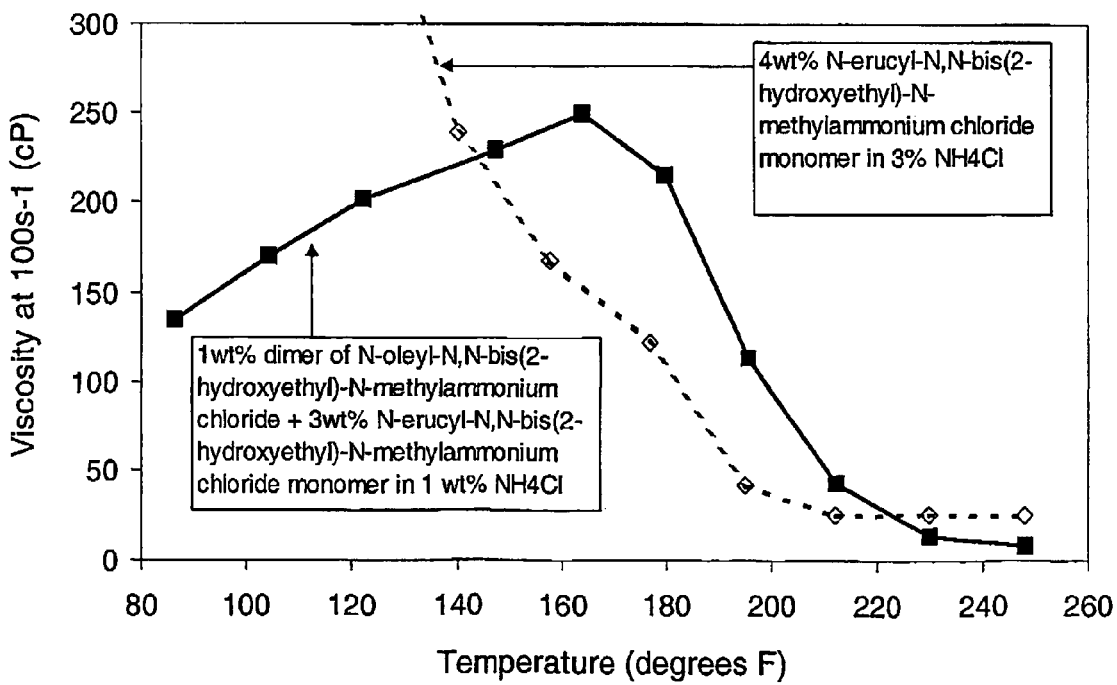
FIG. 15 shows viscosity versus temperature profiles for a solution containing 1 wt % oleyl-dimer and 3 wt % erucyl-monomer and a solution containing 4 wt % erucyl-monomer.

As with the anionic surfactant solutions, the viscoelasticity of both the oleyl- and erucyl-based oligomeric surfactant solutions was destroyed by the addition of hydrocarbons. This was also true for the dimer/monomer blends whose viscosity versus temperature profiles are shown in FIGS. 14 and 15.

Also tests like those discussed above in relation to FIGS. 5a and b showed that the cationic dimer surfactants and dimer/monomer surfactant blends had a reduced tendency to form stable emulsions with hydrocarbons as compared with the corresponding cationic monomeric surfactants.

Figure 16:
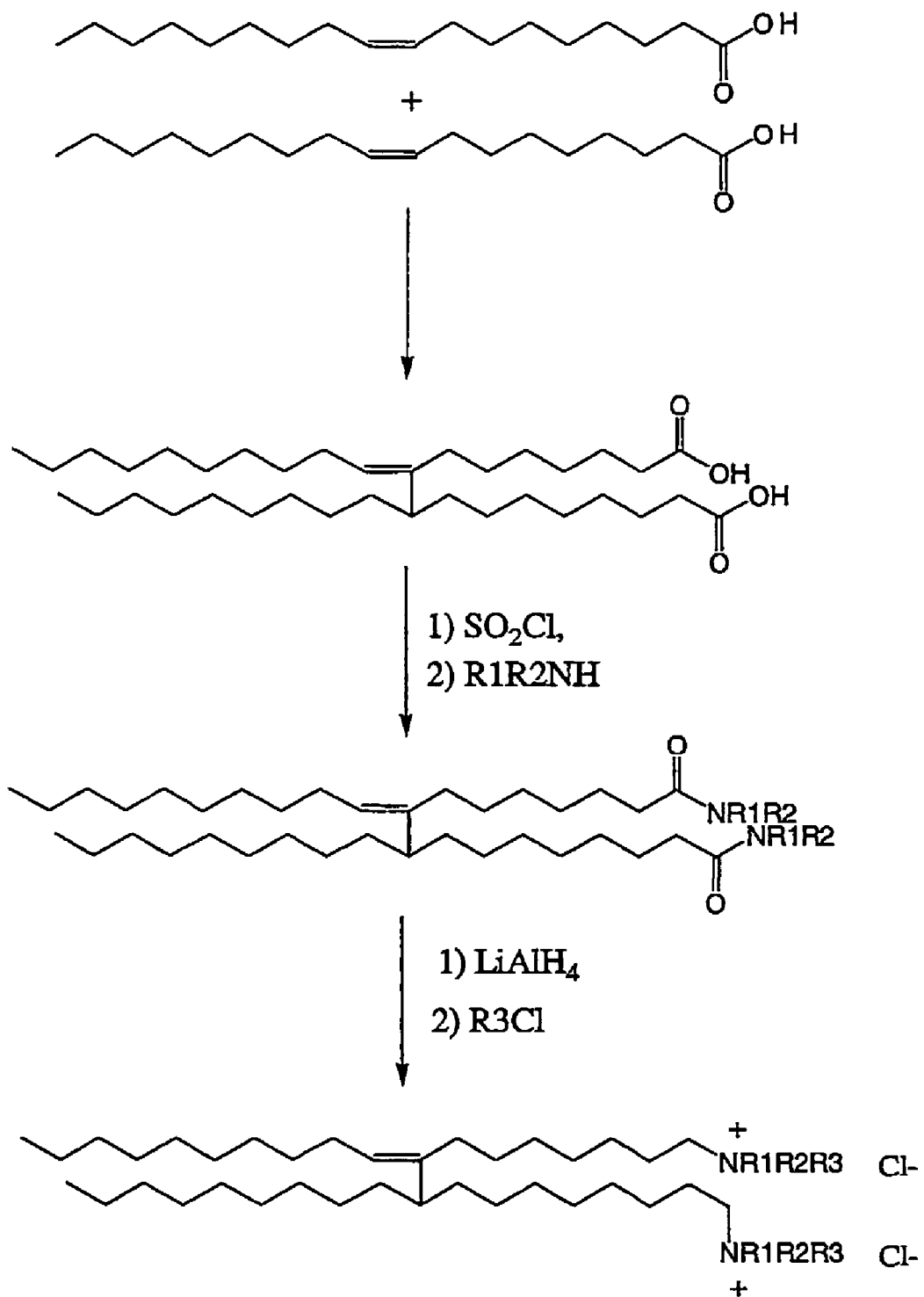
FIG. 16 shows a synthesis route for forming a quaternary ammonium dimer in which the monomer units are linked at their organic tail groups.

FIG. 16 shows a synthesis route for forming an alternative form of oligomeric cationic surfactant in which the monomer units are linked tail group-to-tail group instead of head group-to-head group. $R_1$, $R_2$ and $R_3$ are e.g. methyl groups. In the particular synthesis shown the starting point is oleic acid which is then dimerised to form oleic acid dimer. In fact, as discussed above, oleic acid dimers are commercially available products (e.g. E1016, E1018 and U1009), so it is actually more convenient to start the synthesis with the dimer. The dimer is next converted in two steps to the corresponding quaternary ammonium dimer. This is an example of an oligomer which has a chemically-corresponding monomer repeat unit (N-oleyl-N,N,N-tris(methyl) ammonium chloride) which is different from the monomer (oleic acid) used to form the oligomer in practice.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A method of treating a subterranean formation which comprises at least one hydrocarbon-bearing zone, comprising
providing an oligomeric surfactant with a structure comprising from 2 to 8 linked surfactant monomer subunits, each monomer subunit having a formula $(R_1 X)_p Z_m$, where X is a carboxylate charged group, $R_1$ is a $C_{10}$-$C_{50}$ organic tail group comprising a $C_{10}$-$C_{25}$ straight chain bonded at a terminal atom thereof to X, Z is an alkali metal counterion, and p and m are equal to 1 so that the surfactant monomer subunit is charge neutral,
making a viscoelastic treatment fluid which is an aqueous micellar solution containing a thickening amount of said oligomeric surfactant and where micellar aggregation of surfactant makes said solution viscoelastic,
wherein the wellbore treatment fluid further comprises at least one of an alkali metal carbonate, an alkali metal hydroxide, EDTA, an alkali metal salt of EDTA and a mineral acid, so that the fluid functions to dissolve scale, and
pumping said viscoelastic treatment fluid through a wellbore and into the subterranean formation whereupon contact with hydrocarbons within the formation dissipates the viscosity of said treatment fluid and causes said treatment fluid to selectively invade a hydrocarbon-bearing zone of the formation.

2. A method according to claim 1 wherein $R_1$ is a $C_{15}$-$C_{24}$ straight chain.

3. A method according to claim 1, wherein the oligomer is formed from two to five monomer subunits.

4. A method according to claim 1, wherein the oligomer is a dimer or a trimer.

5. A method according to claim 1 wherein said treatment fluid further comprises a monomeric surfactant.

6. A method according to claim 5 wherein the relative amounts of the oligomeric and monomeric surfactants are adjusted so that the viscosity of the treatment fluid, as measured using a steady shear rheometer at a shear rate of 100 $s^{-1}$, is at least 10 cP for all temperatures in the range 80 to 260° F. (26.5 to 126.5° C.).

7. A method according to claim 1 wherein the thickening amount of said oligomeric surfactant in said treatment fluid is less than 10 percent by weight.

* * * * *